(12) United States Patent
Deheunynck et al.

(10) Patent No.: US 9,045,578 B2
(45) Date of Patent: Jun. 2, 2015

(54) PROCESS FOR FORMING CROSSLINKED AND BRANCHED POLYMERS

(75) Inventors: Damien Deheunynck, Braine L'Alleud (BE); Valerie Smits, Lobbes (BE)

(73) Assignee: DOW CORNING CORPORATION, Midland, MI (US)

(*) Notice: Subject to any disclaimer, the term of this patent is extended or adjusted under 35 U.S.C. 154(b) by 296 days.

(21) Appl. No.: 13/520,866

(22) PCT Filed: Dec. 22, 2010

(86) PCT No.: PCT/EP2010/070483
§ 371 (c)(1),
(2), (4) Date: Jul. 6, 2012

(87) PCT Pub. No.: WO2011/083046
PCT Pub. Date: Jul. 14, 2011

(65) Prior Publication Data
US 2012/0289620 A1 Nov. 15, 2012

(30) Foreign Application Priority Data

Jan. 6, 2010 (GB) .................................. 1000120.4
Dec. 22, 2010 (WO) ................. PCT/EP2010/070483

(51) Int. Cl.
*C08F 255/02* (2006.01)
*C08J 3/24* (2006.01)

(52) U.S. Cl.
CPC ............... *C08F 255/02* (2013.01); *C08J 3/242* (2013.01); *C08J 2309/00* (2013.01); *C08J 2323/02* (2013.01)

(58) Field of Classification Search
CPC ..... C08F 255/02; C08J 3/242; C08J 2309/00; C08J 2323/02
USPC .................. 525/242, 263, 265, 275, 302, 313
See application file for complete search history.

(56) References Cited

U.S. PATENT DOCUMENTS

| | | |
|---|---|---|
| 3,075,948 A | 1/1963 | Santelli |
| 3,179,612 A | 4/1965 | Plueddemann |
| 3,258,477 A | 6/1966 | Plueddemann et al. |
| 3,414,551 A | 12/1968 | Reid et al. |
| 3,458,460 A | 7/1969 | Shepard et al. |
| 3,503,943 A | 3/1970 | Kresge et al. |
| 3,646,155 A | 2/1972 | Scott |
| 3,873,642 A | 3/1975 | Jezl |
| 3,873,643 A | 3/1975 | Wu et al. |
| 4,303,763 A | 12/1981 | Beasley |
| 4,481,322 A | 11/1984 | Godlewski et al. |
| 4,529,750 A | 7/1985 | Gimpel |
| 4,702,868 A | 10/1987 | Pontiff et al. |
| 4,709,084 A | 11/1987 | Pavlin et al. |
| 4,730,031 A | 3/1988 | Sato et al. |
| 4,755,262 A | 7/1988 | Matsunaga et al. |
| 4,795,785 A | 1/1989 | Ito et al. |
| 4,857,250 A | 8/1989 | Gale et al. |
| 4,921,916 A | 5/1990 | Howell et al. |
| 4,946,977 A | 8/1990 | Bernhardt et al. |
| 4,990,383 A | 2/1991 | Bergstrom et al. |
| 5,233,006 A | 8/1993 | Wolter et al. |
| 5,373,059 A | 12/1994 | Asanuma et al. |
| 5,382,633 A | 1/1995 | Scott et al. |
| 5,532,398 A | 7/1996 | Wolter et al. |
| 5,661,200 A | 8/1997 | Boudreaux, Jr. et al. |
| 5,684,171 A | 11/1997 | Wideman et al. |
| 5,852,099 A | 12/1998 | Vanel |
| 5,929,127 A | 7/1999 | Raetzsch et al. |
| 6,013,715 A | 1/2000 | Gornowicz et al. |
| 6,028,146 A | 2/2000 | Kotlar et al. |
| 6,153,691 A | 11/2000 | Gornowicz et al. |
| 6,177,519 B1 | 1/2001 | Chung et al. |

(Continued)

FOREIGN PATENT DOCUMENTS

| | | |
|---|---|---|
| BE | 652324 A | 2/1965 |
| CA | 1099840 A1 | 4/1981 |

(Continued)

OTHER PUBLICATIONS

No English language abstract for BE 652324; However, see English language equivalent GB 1020740. Orginal Document extracted from the espacenet.com database on Sep. 10, 2012, 13 pages.
English language abstract for EP 1318153 extracted from the espacenet.com database on Sep. 10, 2012, 11 pages.
International Search Report for Application No. PCT/EP2010/070481 dated Feb. 4, 2011, 3 pages.
English language abstract for DE 10223073 extracted from the espacenet.com database on Apr. 9, 2012, 10 pages.
English language abstract for EP 0450624 extracted from the espacenet.com database on Apr. 9, 2012, 36 pages.

(Continued)

*Primary Examiner* — Irina S Zemel
*Assistant Examiner* — Jeffrey Lenihan
(74) *Attorney, Agent, or Firm* — Howard & Howard Attorneys PLLC

(57) ABSTRACT

The invention provides a polymer composition comprising a polyolefin or a diene elastomer, and an unsaturated compound (A) containing at least two groups each comprising an olefinic —C═C— bond or acetylenic —C≡C— bond, characterized in that each group comprising an olefinic —C═C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C═C— or acetylenic —C≡C— unsaturation. The use of a multifunctional unsaturated compound (A) containing an aromatic ring or a further olefinic bond conjugated with the olefinic —C═C— or acetylenic —C≡C— unsaturation of the multifunctional unsaturated compound gives enhanced crosslinking and/or branching yield and/or less degradation of the polymer compared to crosslinking with a multifunctional unsaturated compound not containing an aromatic ring or a further olefinic bond.

15 Claims, No Drawings

(56) References Cited

U.S. PATENT DOCUMENTS

| | | | |
|---|---|---|---|
| 6,380,316 | B1 | 4/2002 | Bahadur et al. |
| 6,479,580 | B1 | 11/2002 | Chorvath et al. |
| 6,500,883 | B1 | 12/2002 | Mack et al. |
| 6,590,032 | B2 | 7/2003 | Furukawa et al. |
| 6,590,036 | B2 | 7/2003 | Koike et al. |
| 6,590,039 | B1 | 7/2003 | Wang et al. |
| 6,632,888 | B2 | 10/2003 | Obrecht et al. |
| 6,774,255 | B1 | 8/2004 | Tardivat et al. |
| 6,841,694 | B2 | 1/2005 | Pfeiffer |
| 6,864,322 | B2 | 3/2005 | Gehlsen et al. |
| 6,864,323 | B2 | 3/2005 | Schlosser et al. |
| 6,984,747 | B2 | 1/2006 | Jacob et al. |
| 7,015,297 | B2 | 3/2006 | Schindler et al. |
| 7,041,744 | B2 | 5/2006 | Palmlof et al. |
| 7,074,876 | B2 | 7/2006 | Cruse et al. |
| 7,078,449 | B2 | 7/2006 | Pagano et al. |
| 7,238,740 | B2 | 7/2007 | Belin et al. |
| 7,241,824 | B2 | 7/2007 | Mangeret et al. |
| 8,008,524 | B2 | 8/2011 | Cruse et al. |
| 8,013,178 | B2 | 9/2011 | Klockmann et al. |
| 2002/0040101 | A1 | 4/2002 | Furukawa et al. |
| 2003/0114604 | A1 | 6/2003 | Schlosser et al. |
| 2003/0139621 | A1 | 7/2003 | Jacob et al. |
| 2003/0144403 | A1 | 7/2003 | Barruel et al. |
| 2005/0004386 | A1 | 1/2005 | Deschler et al. |
| 2005/0031813 | A1 | 2/2005 | Conrnette et al. |
| 2005/0107551 | A1* | 5/2005 | Lang et al. ................. 526/82 |
| 2005/0119436 | A1 | 6/2005 | Ziche et al. |
| 2005/0131154 | A1 | 6/2005 | Cai et al. |
| 2005/0269737 | A1 | 12/2005 | Hogge et al. |
| 2005/0272867 | A1 | 12/2005 | Hogge et al. |
| 2005/0287300 | A1 | 12/2005 | Herrwerth et al. |
| 2006/0025506 | A1 | 2/2006 | Weller et al. |
| 2009/0143531 | A1 | 6/2009 | Ouhadi et al. |
| 2009/0186961 | A1 | 7/2009 | Araujo Da Silva et al. |
| 2009/0234066 | A1 | 9/2009 | Araujo Da Silva et al. |
| 2009/0264584 | A1 | 10/2009 | Walia et al. |
| 2010/0016500 | A1 | 1/2010 | Sone et al. |
| 2010/0040927 | A1 | 2/2010 | Yoshida et al. |
| 2010/0168343 | A1 | 7/2010 | Harris et al. |
| 2011/0152458 | A1 | 6/2011 | Araujo Da Silva et al. |
| 2011/0172367 | A1 | 7/2011 | Backer et al. |
| 2011/0178198 | A1 | 7/2011 | Backer et al. |
| 2011/0190411 | A1 | 8/2011 | Backer et al. |
| 2011/0287205 | A1 | 11/2011 | Klockmann et al. |
| 2012/0059121 | A1 | 3/2012 | Backer et al. |
| 2012/0065319 | A1 | 3/2012 | Backer et al. |
| 2012/0283346 | A1 | 11/2012 | Backer et al. |
| 2012/0283362 | A1 | 11/2012 | Backer et al. |
| 2012/0283388 | A1 | 11/2012 | Backer et al. |

FOREIGN PATENT DOCUMENTS

| | | |
|---|---|---|
| CN | 1747976 A | 3/2006 |
| DE | 10223073 C1 | 10/2003 |
| DE | 102006059295 A1 | 6/2008 |
| EP | 0225186 A2 | 6/1987 |
| EP | 0245938 A2 | 11/1987 |
| EP | 0276790 A2 | 8/1988 |
| EP | 0372561 A2 | 6/1990 |
| EP | 0581150 A2 | 2/1994 |
| EP | 0735088 A1 | 10/1996 |
| EP | 0776945 A2 | 6/1997 |
| EP | 0809672 B1 | 12/1997 |
| EP | 0900801 A1 | 3/1999 |
| EP | 0943635 A1 | 9/1999 |
| EP | 0451709 B1 | 12/1999 |
| EP | 1018533 A2 | 7/2000 |
| EP | 1022302 A2 | 7/2000 |
| EP | 1050548 A1 | 11/2000 |
| EP | 0450624 B1 | 9/2001 |
| EP | 1134251 A1 | 9/2001 |
| EP | 1270581 A2 | 1/2003 |
| EP | 1318153 A1 | 6/2003 |
| EP | 1323779 A1 | 7/2003 |
| EP | 1354912 A1 | 10/2003 |
| EP | 1375569 A1 | 1/2004 |
| EP | 1619214 A1 | 1/2006 |
| EP | 1683801 A2 | 7/2006 |
| EP | 1721930 A1 | 11/2006 |
| EP | 1818186 A1 | 8/2007 |
| EP | 1942131 A1 | 7/2008 |
| EP | 0958298 B2 | 10/2008 |
| EP | 2039705 A1 | 3/2009 |
| EP | 2085419 A1 | 8/2009 |
| GB | 957917 A | 5/1964 |
| GB | 1020740 A | 2/1966 |
| GB | 1407827 | 9/1975 |
| GB | 2134530 A | 8/1984 |
| GB | 2192891 A | 1/1988 |
| GB | 2202537 A | 2/1988 |
| JP | 59-147035 A | 8/1984 |
| JP | 3143979 A | 6/1991 |
| JP | 05-070529 A | 3/1993 |
| JP | 06-172459 | 6/1994 |
| JP | 2007-308653 A | 11/2007 |
| JP | 2007329069 | 12/2007 |
| JP | 2008097868 A | 4/2008 |
| JP | 2008-106118 A | 5/2008 |
| JP | 2008-184545 | 8/2008 |
| WO | WO 87/05916 A2 | 10/1987 |
| WO | WO 00/52072 A1 | 9/2000 |
| WO | WO 00/52073 A1 | 9/2000 |
| WO | WO 0052071 A1 | 9/2000 |
| WO | WO 00/63293 A1 | 10/2000 |
| WO | WO 01/49781 A1 | 7/2001 |
| WO | WO 01/49782 A1 | 7/2001 |
| WO | WO 01/49783 A1 | 7/2001 |
| WO | WO 02/22728 A1 | 3/2002 |
| WO | WO 03/091314 A1 | 11/2003 |
| WO | WO 2004072135 A1 | 8/2004 |
| WO | WO 2004/078813 A2 | 9/2004 |
| WO | WO 2005/001037 A2 | 1/2005 |
| WO | WO 2005/007066 A2 | 1/2005 |
| WO | WO 2005/103061 A1 | 11/2005 |
| WO | WO 2006/019468 A1 | 2/2006 |
| WO | WO 2006015010 A2 | 2/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007008765 A2 | 1/2007 |
| WO | WO 2007/014687 A1 | 2/2007 |
| WO | WO 2007/061550 A1 | 5/2007 |
| WO | WO 2007147687 A1 | 12/2007 |
| WO | WO 2008/042418 A1 | 4/2008 |
| WO | WO 2009/073274 A1 | 6/2009 |
| WO | WO 2010/000477 A1 | 1/2010 |
| WO | WO 2010/000478 A1 | 1/2010 |
| WO | WO 2010/000479 A1 | 1/2010 |
| WO | WO 2010/003007 A2 | 1/2010 |
| WO | WO 2010/005525 A1 | 1/2010 |
| WO | WO 2010/125123 A1 | 11/2010 |
| WO | WO 2010/125124 A1 | 11/2010 |
| WO | WO 2011/083043 A1 | 7/2011 |
| WO | WO 2011/083044 A1 | 7/2011 |
| WO | WO 2011/083045 A1 | 7/2011 |

OTHER PUBLICATIONS

English language abstract for EP 0451709 extracted from the espacenet.com database on Apr. 9, 2012, 24 pages.

English language abstract for EP 0735088 extracted from the espacenet.com database on Apr. 9, 2012, 13 pages.

English language abstract for EP 1683801 extracted from the espacenet.com database on Apr. 9, 2012, 49 pages.

English language abstract for JP 2008-106118 extracted from the PAJ database on Apr. 9, 2012, 27 pages.

English language abstract and translation for JP 2008-184545 extracted from the PAJ database on Apr. 9, 2012, 34 pages.

English language abstract for WO 01/49781 extracted from the espacenet.com database on Apr. 9, 2012, 49 pages.

English language abstract for WO 01/49782 extracted from the espacenet.com database on Apr. 9, 2012, 44 pages.

(56) References Cited

OTHER PUBLICATIONS

English language abstract for WO 01/49783 extracted from the espacenet.com database on Apr. 9, 2012, 36 pages.
English language abstract for WO 02/22728 extracted from the espacenet.com database on Apr. 9, 2012, 41 pages.
English language abstract for WO 2006/125532 extracted from the espacenet.com database on Apr. 9, 2012, 40 pages.
English language abstract for WO 2006/125533 extracted from the espacenet.com database on Apr. 9, 2012, 53 pages.
English language abstract for WO 2006/125534 extracted from the espacenet.com database on Apr. 9, 2012, 53 pages.
International Search Report for Application No. PCT/EP2010/055754 dated Oct. 15, 2010, 3 pages.
International Search Report for Application No. PCT/EP2010/055757 dated Jun. 7, 2010, 4 pages.
English language abstract not available for CN 1747976; However, see English language equivalent US 20090264584. Original Document extracted from the espacenet.com database on Aug. 3, 2012, 19 pages.
English language abstract for EP 0245938 extracted from the espacenet.com database on Jul. 13, 2011, 28 pages.
International Search Report for Application No. PCT/EP2009/004797 dated Sep. 4, 2009, 11 pages.
International Search Report for Application No. PCT/EP2009/004798 dated Sep. 1, 2009, 6 pages.
International Search Report for Application No. PCT/EP2009/004799 dated Sep. 9, 2009, 9 pages.
N.C. Liu et al.,"Influences of grafting formulations and processing conditions on properties of silane grafted moisture crosslinked polypropylenes", Polymer 41 (2000), pp. 4537-4542.
H. Huang et al.,"Influences on grafting formulations and extrusion conditions on properties of silane grafted polypropylenes", Applied Polymer Science 78 (2000), pp. 1233-1238.
Shujing Yang et al., "Mechanism of a One-Step Method for Preparing Silane Grafting and Crosslinking Polypropylene", Polymer Engineering and Science, 2007, pp. 1004-1008.
March's Advanced Organic Chemistry, 5th Edition, John Wiley & Sons, NY 2001, at chapter 15-58, pp. 1062-1063.
B.C. Ranu et al., "Significant rate acceleration of the aza-Michael reaction in water", Tetrahedron Letters 48 (2007), pp. 141-143.
International Search Report for Application No. PCT/EP2010/070480 dated Mar. 4, 2011, 4 pages.
International Search Report for Application No. PCT/EP2010/070482 dated Feb. 2, 2011, 4 pages.
The Vanderbilt Rubber Handbook (1978), pp. 344-346.
Do Hung Han et al., "Crosslinking and degradation of polypropylene by electron beam irradiation in the presence of trifunctional monomers", Radiation Physics and Chemistry 69 (2004) 239-244.
Coiai S. et al., "Control of Degradation Reactions during Radical Functionalization of Polypropylene in the Melt", vol. 37, No. 22, Nov. 2, 2004, pp. 8414-8423.
Deng Changfu et al., "Grafting of Maleic Anhydride onto Hyperbranched Polyethylene and Suppression of Chain Degradation and Crosslinking Side Reactions", No. 5, 2008, pp. 435-441.
Liu et al., "Reactive Adsorption of Aminosilane onto the Glycidyl Methacrylate Graft-Copolymerized Poly (tetrafluoroethylene) Film Surface for Adhesion Enhancement with Evaporated Copper", Journal of Polymer Science: Part A Polymer Chemistry, vol. 38, No. 1, Jan. 2000, pp. 80-89.
English language abstract and translation for JP 06-172459 extracted from the PAJ database on Jul. 13, 2011, 25 pages.
English language abstract and translation for JP 2007329069 extracted from the PAJ database on Jul. 13, 2012, 26 pages.
English language abstract for JP 2008097868 extracted from the espacenet.com database on Jul. 13, 2012, 33 pages.
English language abstract for JP 59-147035 extracted from the PAJ database on Oct. 31, 2012, 9 pages.
English language abstract and translation for JP 2007-308653 extracted from the PAJ database on Oct. 31, 2012, 71 pages.
English language abstract and translation extracted for JP 05-070529 from the PAJ database on Oct. 31, 2012, 76 pages.
English language abstract for EP 0735088 extracted from the espacenet.com database on Nov. 5, 2012, 13 pages.
English language abstract and machine-assisted English translation for DE 102006059295 extracted from the espacenet.com database on Nov. 5, 2012, 39 pages.
English language abstract for JP 3143979 extracted from the espacenet.com database on Nov. 5, 2012, 12 pages.

\* cited by examiner

PROCESS FOR FORMING CROSSLINKED AND BRANCHED POLYMERS

RELATED APPLICATIONS

This application is the National Stage of International Patent Application No. PCT/EP2010/070483, filed on Dec. 22, 2010 which claims priority to Great Britain Patent Application No. GB 1000120.4, filed on Jan. 6, 2010.

This invention relates to a process for forming crosslinked and/or branched polymers, and to polymer compositions capable of reacting to form crosslinked and/or branched polymers.

GB 957917 describes polymers of ethylenically-unsaturated monomers are vulcanized by heating the polymer with a source of free radicals, a filler, and an unsaturated compound of the general formula R—CH=CH—CH=CH—X wherein R is an alkyl or aryl group and X is a carboxyl group, an aldehyde group, an acid chloride group, an acidamide group, or an ester group.

U.S. Pat. No. 4,303,763 describes unsaturated ethylene polymers characterized by the process, comprising the step of reacting a saturated, linear polyethylene directly with a diene monomer in the melt phase, CA 1099840 describes a method for cross-linking elastomers containing randomly distributed sites of conjugated olefinic unsaturation with monomers adsorbed onto granular adsorbent and dispersed into the elastomer, the weight ratio of monomer to adsorbent being from about 100:1 to 1:1.

The crosslinking of polymers such as polyolefins and diene elastomers by multifunctional acrylates is known for example from the articles "Crosslinking and degradation of polypropylene by electron beam irradiation in the presence of trifunctional monomers", Do Hung Han, Seung-Ho Shin and Serguei Petrov, Radiation physics and chemistry; 2004, vol. 69, n 3, pp. 239-244; "Cross-Linking of polypropylene by peroxide and multifunctional monomer during reactive extrusion", B. K. Kim, K. J. Kim, Advances in Polymer Technology; Volume 12 Issue 3, Pages 263-269 (March 2003); "Branching of Polypropylene with a Polyfunctional Monomer for Extrusion, Foaming and Thermoforming Applications", D. W. Yu, S. K. Dey, F. Pringgosusanto and M. Xanthos, ANTEC 2000 conference proceedings, by Society of Plastics Engineers; "Efficiency of Chemical Cross-Linking of Polypropylene", E. Borsig; A. Fiedlerov; M. Lazr, Journal of Macromolecular Science, Part A, Volume 16, Issue 2 Jul. 1981, pages 513-528; and "Application of co-agents for peroxide crosslinking, W. C. Endstra, Kautschuk and Gummi, Kunststoffe; 1990, vol. 43, n 9, pp. 790-793. These describe processes for grafting the multifunctional acrylate onto the polyolefin in the presence of means capable of generating free radical sites in the polyolefin, for example by heating in the presence of peroxide.

When trying to modify polypropylene using the above technologies, the grafting is accompanied by degradation of the polymer by chain scission in the β-position, or so-called β-scission. Such degradation results in a decrease of the viscosity of the material to be processed. The use of a co-agent such as styrene in combination with the multifunctional acrylate inhibits polymer degradation but there is still a need for improved crosslinking without polymer degradation.

A process according to one aspect of the present invention for forming a crosslinked or branched polyolefin comprises reacting the polyolefin with an unsaturated compound (A) containing more than two groups each comprising an olefinic —C=C— bond or acetylenic —C≡C— bond in the presence of means capable of generating free radical sites in the polyolefin, characterized in that each group comprising an olefinic —C=C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation.

According to another aspect of the invention a process for forming a crosslinked or branched diene elastomer comprises reacting the diene elastomer with an unsaturated compound (A) containing more than two groups each comprising an olefinic —C=C— bond or acetylenic —C≡C— bond, characterized in that each group comprising an olefinic —C=C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation.

A polymer composition according to the invention comprises a polyolefin or a diene elastomer, and an unsaturated compound (A) containing at least two groups each comprising an olefinic —C=C— bond or acetylenic —C≡C— bond, characterized in that each group comprising an olefinic —C=C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation. When the polymer is a polyolefin, such a composition will form a crosslinked or branched polyolefin when subjected to means for generating free radical sites in the polyolefin. When the polymer is a diene elastomer, the composition will form a crosslinked or branched elastomer on heating without any specific means for generating free radical sites in the elastomer.

The invention includes the use of an unsaturated compound (A) containing more than two groups each comprising an olefinic —C=C— bond or acetylenic —C≡C— bond, in which each group comprising an olefinic —C=C— bond or acetylenic —C≡C— bond contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation, in crosslinking a polyolefin with less degradation of the polyolefin compared to crosslinking with a polyunsaturated compound not containing conjugated unsaturation.

We have found according to the invention that the use of a multifunctional unsaturated compound (A) containing an aromatic ring or a further olefinic bond conjugated with the olefinic —C=C— or acetylenic —C≡C— unsaturation of the multifunctional unsaturated compound in carrying out the crosslinking reaction on the polyolefin gives enhanced crosslinking and/or branching yield and/or less degradation of the polymer compared to crosslinking with a multifunctional unsaturated compound not containing an aromatic ring or a further olefinic bond. The use of a co-agent such as styrene has some limitation as a competitive reaction takes place between grafting with co-agent and grafting with the multifunctional unsaturated compound. The styrene co-agent cannot provide crosslinking or branching. The process of the present invention provides a high crosslinking and/or branching efficiency while preventing chain scission with a single molecule. There is no competitive reaction between the crosslinking monomer and the monomer which inhibits degradation, and hence the invention provides a more efficient reaction.

The polyolefin starting material can for example be a polymer of an olefin having 2 to 18 carbon atoms, particularly an alpha olefin of the formula $CH_2=CHQ$ where Q is a hydrogen or a linear or branched alkyl group having 1 to 8 carbon atoms. The polyolefin can be polyethylene or an ethylene copolymer, but polyethylene and polymers consisting mainly of ethylene units do not usually degrade when free radical sites are generated in the polyethylene. Many polymers of olefins having 3 or more carbon atoms, for example polypropylene, undergo polymer degradation by chain β-scission when free radical sites are generated in the polyolefin. The process of the invention is particularly useful for such polyolefins, since it achieves grafting while inhibiting degradation of the polyolefin.

The polyolefin can for example be a polymer of ethene (ethylene), propene (propylene), butene or 2-methyl-propene-1 (isobutylene), hexene, heptene, octene, styrene. Propylene and ethylene polymers are an important class of polymers, particularly polypropylene and polyethylene. Polypropylene is a commodity polymer which is broadly available and of low cost. It has low density and is easily processed and versatile. Most commercially available polypropylene is isotactic polypropylene, but the process of the invention is applicable to atactic and syndiotactic polypropylene as well as to isotactic polypropylene. Isotactic polypropylene is prepared for example by polymerization of propene using a Ziegler-Natta catalyst or a metallocene catalyst. The invention can provide a crosslinked polypropylene of improved properties from commodity polypropylene. The polyethylene can for example be high density polyethylene of density 0.955 to 0.97 $g/cm^3$, medium density polyethylene (MDPE) of density 0.935 to 0.955 $g/cm^3$ or low density polyethylene (LDPE) of density 0.918 to 0.935 $g/cm^3$ including ultra low density polyethylene, high pressure low density polyethylene and low pressure low density polyethylene, or microporous polyethylene. The polyethylene can for example be produced using a Ziegler-Natta catalyst, a chromium catalyst or a metallocene catalyst. The polyolefin can be a copolymer or terpolymer, for example a copolymer of propylene with ethylene or a copolymer of propylene or ethylene with an alpha-olefin having 4 to 18 carbon atoms, or of ethylene or propylene with an acrylic monomer such as acrylic acid, methacrylic acid, acrylonitrile, methacrylonitrile or an ester of acrylic or methacrylic acid and an alkyl or substituted alkyl group having 1 to 16 carbon atoms, for example ethyl acrylate, methyl acrylate or butyl acrylate, or a copolymer with vinyl acetate. The polyolefin can be heterophasic, for example a propylene ethylene block copolymer.

A mixture of different polyolefins can be used. The multifunctional unsaturated compound (A) can be mixed with one type of polyolefin to form a masterbatch which can subsequently be mixed with a different type of polyolefin. For example microporous polypropylene is very effective in mixing with liquid additives to form a masterbatch, which can be mixed with bulk polymer. Microporous polyethylene or ethylene vinyl acetate copolymer are also very effective in mixing with liquid additives to form a masterbatch, and such a masterbatch can be mixed with a polymer such as polypropylene.

The diene elastomer can be natural rubber. The diene elastomer can alternatively be a synthetic polymer which is a homopolymer or copolymer of a diene monomer (a monomer bearing two double carbon-carbon bonds, whether conjugated or not). Preferably the elastomer is an "essentially unsaturated" diene elastomer, that is a diene elastomer resulting at least in part from conjugated diene monomers, having a content of members or units of diene origin (conjugated dienes) which is greater than 15 mol %. More preferably it is a "highly unsaturated" diene elastomer having a content of units of diene origin (conjugated dienes) which is greater than 50%. Diene elastomers such as butyl rubbers or copolymers of dienes and of alpha-olefins of the ethylene-propylene diene monomer (EPDM) type, which may be described as "essentially saturated" diene elastomers having a low (less than 15%) content of units of diene origin, can alternatively be used.

The diene elastomer can for example be:
(a) any homopolymer obtained by polymerization of a conjugated diene monomer having 4 to 12 carbon atoms;
(b) any copolymer obtained by copolymerization of one or more dienes conjugated together or with one or more vinyl aromatic compounds having 8 to 20 carbon atoms;
(c) a ternary copolymer obtained by copolymerization of ethylene, of an [alpha]-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The diene elastomer copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalized with a coupling and/or starring or functionalizing agent. Examples of preferred block copolymers are styrene-butadiene-styrene (SBS) block copolymers and styrene-ethylene/butadiene-styrene (SEBS) block copolymers.

Preferred are polybutadienes, and in particular those having a content of 1,2-units between 4% and 80%, or those having a content of cis-1,4 of more than 80%, polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%.

The elastomer can be epoxidised rubber, for example Epoxidised Natural Rubber (ENR). Epoxidised rubber is obtained by modifying rubber, for example natural rubber, in which some in saturation are replaced by epoxy groups through a chemical modification. Useful epoxidized rubber will have an extent of epoxidation of about 5 to about 95 mole %, preferably from about 15 to about 80 mole %, and more preferably from about 20 to about 50 mole %, where the extent of epoxidation is defined as the mole percentage of olefinically unsaturated sites originally present in the rubber that have been converted to oxirane, hydroxyl, or ester groups.

Epoxidation reactions can be effected by reacting an unsaturated rubber with an epoxidizing agent. Useful epoxidizing agents include peracids such as m-chloroperbenzoic acid and peracetic acid. Other examples include carboxylic acids, such as acetic and formic acid, or carboxylic anhydrides such as acetic anhydride, together with hydrogen peroxide. A catalyst, such as sulfuric acid, p-tolulene sulfonic acid, or a cationic exchange resin such as sulfonated polystyrene may optionally be employed.

Epoxidation is preferably conducted at a temperature from about 0° to about 150° C. and preferably from about 25° to about 80° C. The time required to effect the epoxidation reaction is typically from about 0.25 to about 10 hours, and preferably from about 0.5 to about 3 hours.

The epoxidation reaction is preferably conducted in a solvent that is capable of substantially dissolving the rubber both in its original condition and after epoxidation. Suitable solvents include aromatic solvents such as benzene, tolulene, xylene, and chlorobenzene, as well as cycloaliphatic solvents such as cyclohexane, cycloheptane, and mixtures thereof.

After epoxidation, the epoxidized rubber is preferably removed or isolated from the acidic environment, which may include the epoxidizing agents as well as the acidic catalyst. This isolation can be accomplished via filtration, or by adding a dilute aqueous base to neutralize the acid and then subsequently coagulate the polymer. The polymer can be coagulated by using an alcohol such as methanol, ethanol, or propanol. An antioxidant is typically added after the isolation procedure, and the final product may be dried using techniques such as vacuum distillation. Alternatively, other known methods for removing polymers from hydrocarbon solvents and the like may be employed including steam stripping and drum drying.

Other diene elastomer can also be used in epoxydised form such as, but not limited to, those rubbers that derive from the polymerization of conjugated dienes alone or in combination with vinyl aromatic monomers.

The elastomer can be an alkoxysilane-terminated diene polymer or a copolymer of the diene and an alkoxy containing molecule prepared via a tin coupled solution polymerization.

In the unsaturated compound (A), each group comprising an olefinic —C═C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C═C— or acetylenic —C≡C— unsaturation. According to one aspect of the invention, each group comprising an olefinic —C═C— bond or acetylenic —C≡C— bond in the unsaturated compound (A) also contains an electron-withdrawing moiety with respect to the olefinic —C═C— or acetylenic —C≡C— bond.

An electron-withdrawing moiety is a chemical group which draws electrons away from a reaction centre. The electron-withdrawing linkage X can in general be any of the groups listed as dienophiles in Michael B. Smith and Jerry March; March's Advanced Organic Chemistry, 5$^{th}$ edition, John Wiley & Sons, New York 2001, at Chapter 15-58 (page 1062). The linkage X can be especially a C(═O)R*, C(═O)OR*, OC(═O)R*, C(═O)Ar linkage in which Ar represents arylene and R* represents a divalent hydrocarbon moiety. X can also be a C(═O)—NH—R* linkage.

Each group comprising an olefinic —C═C— bond or acetylenic —C≡C— bond in the unsaturated compound (A) can for example have the formula R—CH═CH—CH═CH—Y—, where R represents hydrogen or a hydrocarbyl group having 1 to 12 carbon atoms and Y represents an organic linkage having an electron withdrawing effect with respect to the adjacent —CH═CH— bond. Alternatively the unsaturated compound (A) can have the formula Ar—CH═CH—Y—. The linkage Y having an electron withdrawing effect can for example be a carboxyl linkage, so that the unsaturated compound (A) can be an ester of a polyhydric alcohol.

The unsaturated compound (A) contains at least two groups each comprising an olefinic —C═C— bond or acetylenic —C≡C— bond. Grafting of the compound (A) to the polyolefin or diene elastomer through reaction of one of these allows further reaction of the second olefinic —C═C— bond or acetylenic —C≡C— bond to give branching or crosslinking. Unsaturated compounds (A) having on average more than two groups each comprising an olefinic —C═C— bond or acetylenic —C≡C— bond per molecule, for example unsaturated compounds (A) containing 3 to 6 such groups, may be preferred to increase the density of crosslinking.

The unsaturated compound (A) can for example be an ester of any polyhydric alcohol having 2 to 6 or more —OH groups, for example 3-(hydroxymethyl)pentane-1,5-diol (trimethylolpropane or TMP), pentaerythritol, propane-1,3-diol, propane-1,2-diol (propylene glycol), ethylene glycol, glycerol or sorbitol. A polyhydric alcohol having 3 or more —OH groups can be fully or partly esterified.

The unsaturated compound (A) can for example be a sorbate ester of a polyhydric alcohol, such as pentaerythritol trisorbate,

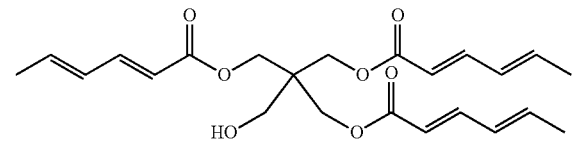 [SMILES: C/C=C/C=C/C(=O)OCC(CO)(COC(=O)/C=C/C=C/C)COC(=O)/C=C/C=C/C]

pentaerythritol tetrasorbate,

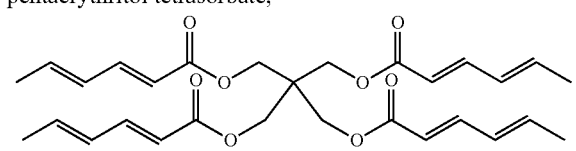

trimethylolpropane trisorbate,

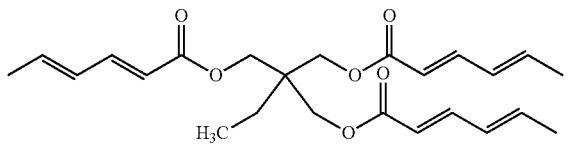 [SMILES: C/C=C/C=C/C(=O)OCC(CC)(COC(=O)/C=C/C=C/C)COC(=O)/C=C/C=C/C]

propane-1,2-diol disorbate or propane-1,3-diol disorbate,

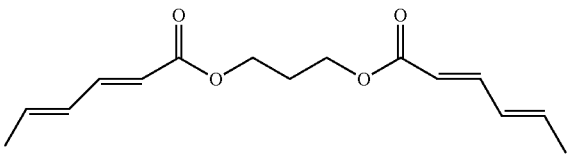 [SMILES: C/C=C/C=C/C(=O)OCCCOC(=O)/C=C/C=C/C]

or a cinnamate ester of a polyhydric alcohol, such as trimethylolpropane tricinnamate. The preparation of pentaerythritol tetrasorbate by acid catalyzed esterification is described in Example 4 of U.S. Pat. No. 3,458,460. Sorbates of other polyhydric alcohols can be prepared by the same technique.

Grafting of the unsaturated compound (A) to the polyolefin to an extent that gives sufficient crosslinking and/or branching of the polyolefin to improve the stability and/or physical properties of the polyolefin generally requires means capable of generating free radical sites in the polyolefin but is optional (and preferably not required) with respect to diene elastomers. The means for generating free radical sites in the polyolefin preferably comprises a compound capable of generating free radicals, and thus capable of generating free radical sites in the polyolefin. Other means include applying shear, heat or irradiation such as electron beam radiation. The high temperature and high shear rate generated by a melt extrusion process can generate free radical sites in the polyolefin.

The compound capable of generating free radical sites in the polyolefin is preferably an organic peroxide, although other free radical initiators such as azo compounds can be used. Preferably the radical formed by the decomposition of the free-radical initiator is an oxygen-based free radical. It is more preferable to use hydroperoxides, carboxylic peroxyesters, peroxyketals, dialkyl peroxides and diacyl peroxides, ketone peroxides, diaryl peroxides, aryl-alkyl peroxides, peroxydi carbonates, peroxyacids, acyl alkyl sulfonyl peroxides and monoperoxydicarbonates. Examples of preferred peroxides include dicumyl peroxide, 2,5-dimethyl-2,5-di-(tert-butylperoxy)hexane, di-tert-butyl peroxide, 2,5-dimethyl-2,5-di-(tert-butylperoxy)hexyne-3,3,6,9-triethyl-3,6,9-trimethyl-1,4,7-triperoxonane, benzoyl peroxide, 2,4-dichlorobenzoyl peroxide, tert-butyl peroxyacetate, tert-butyl peroxybenzoate, tert-amylperoxy-2-ethylhexyl carbonate, tert-butylperoxy-3,5,5-trimethylhexanoate, 2,2-di(tert-butylperoxy)butane, tert-butylperoxy isopropyl carbonate, tert-buylperoxy-2-ethylhexyl carbonate, butyl 4,4-di(tert-buylperoxy)valerate, di-tert-amyl peroxide, tert-butyl peroxy pivalate, tert-butyl-peroxy-2-ethyl hexanoate, di(tert-tbutylperoxy) cyclohexane, tertbutylperoxy-3,5,5-trimethylhexanoate, di(tertbutylperoxyisopropyl) benzene, cumene hydroperoxide, tert-butyl peroctoate, methyl ethyl ketone peroxide, tert-butyl α-cumyl peroxide, 2,5-dimethyl-2,5-di (peroxybenzoate)hexyne-3, 1,3- or 1,4-bis(t-butylperoxyisopropyl)benzene, lauroyl peroxide, tert-butyl peracetate, and tert-butyl perbenzoate. Examples of azo compounds are azobisisobutyronitrile and dimethylazodiisobutyrate. The above radical initiators can be used alone or in combination of at least two of them.

The temperature at which the polyolefin and the unsaturated compound (A) are reacted in the presence of the compound capable of generating free radical sites in the polyolefin is generally above 120° C., usually above 140° C., and is sufficiently high to melt the polyolefin and to decompose the free radical initiator. For polypropylene and polyethylene, a temperature in the range 170° C. to 220° C. is usually preferred. The peroxide or other compound capable of generating free radical sites in the polyolefin preferably has a decomposition temperature in a range between 120-220° C., most preferably between 160-190° C. In one preferred procedure, the polyolefin, the unsaturated compound (A) and the compound capable of generating free radical sites in the polyolefin are mixed together at above 120° C. in a twin screw extruder to graft the unsaturated compound (A) to the polymer and thereby cause crosslinking and/or branching of the polyolefin.

The compound capable of generating free radical sites in the polyolefin is generally present in an amount of at least 0.01% by weight of the total composition and can be present in an amount of up to 5 or 10%. An organic peroxide, for example, is preferably present at 0.01 to 2% by weight based on the polyolefin during the grafting reaction. Most preferably, the organic peroxide is present at 0.01% to 0.5% by weight of the total composition.

The means for generating free radical sites in the polyolefin can alternatively be an electron beam. If electron beam is used, there is no need for a compound such as a peroxide capable of generating free radicals. The polyolefin is irradiated with an electron beam having an energy of at least 5 MeV in the presence of the unsaturated silane (I) or (II). Preferably, the accelerating potential or energy of the electron beam is between 5 MeV and 100 MeV, more preferably from 10 to 25 MeV. The power of the electron beam generator is preferably from 50 to 500 kW, more preferably from 120 to 250 kW. The radiation dose to which the polyolefin/grafting agent mixture is subjected is preferably from 0.5 to 10 Mrad. A mixture of polyolefin and the unsaturated compound (A) can be deposited onto a continuously moving conveyor such as an endless belt, which passes under an electron beam generator which irradiates the mixture. The conveyor speed is adjusted in order to achieve the desired irradiation dose.

Grafting of the unsaturated compound (A) to the diene elastomer to an extent that gives sufficient crosslinking and/or branching of the polyolefin to improve the stability and/or physical properties of the diene generally proceeds via an ene reaction and does not require means capable of generating free radical sites in the polyolefin. The elastomer and the unsaturated compound (A) can be reacted by various procedures. Although some reaction occurs at ambient temperature, the elastomer and the unsaturated compound (A) are preferably heated together at a temperature of at least 80° C., more preferably to a temperature between 90°-200° C., most preferably between 120° C. and 180° C. The elastomer and unsaturated compound (A) can be mixed by pure mechanical mixing, followed if desired by a separate heating step, but mixing and heating are preferably carried out together so that the elastomer is subjected to mechanical working while it is heated. The unsaturated compound (A) grafted to the diene elastomer acts as an anti-reversion agent in rubber manufacturing.

The elastomer and the unsaturated compound (A) can be reacted in the presence of a catalyst which accelerates the ene-addition reaction between the unsaturated compound (A)

and the diene containing rubber polymer, for example a Lewis acid such as boron triacetate. Use of such a catalyst can reduce the temperature of the thermomechanical processing required to effect reaction between the elastomer and the unsaturated compound (A). The catalyst can control the number of links created during the mixing phase to optimize the torque. However the diene elastomer and the unsaturated compound (A) react readily at the temperatures conventionally used for thermomechanical kneading of rubber, and it may be desirable to avoid catalyst residues in the crosslinked or branched elastomer.

Diene elastomer compositions which are to be cured to a shaped rubber article are usually produced using two successive preparation phases: a first phase of thermomechanical mixing or kneading (sometimes referred to "non-productive" phase) at high temperature, up to a maximum temperature ($T_{max}$) between 110°-190° C., followed by a second phase of mechanical mixing (sometimes referred to "productive" phase) at temperature typically less than 110° C., during which the cross-linking and vulcanization systems are incorporated. The catalyst such as a Lewis acid can also be added during the productive phase in order to accelerate the cure behaviour under heating of the semi-finished article.

Diene elastomer compositions according to the invention which are to be cured to a shaped rubber article generally contain a filler, particularly a reinforcing filler such as silica or carbon black. The filler is usually mixed with the elastomer in the non-productive thermomechanical mixing or kneading phase, and the unsaturated compound (A) is also mixed with the elastomer and filler in this stage.

The polyolefin composition according to the invention may contain a filler. The filler can conveniently be mixed into the polyolefin with the unsaturated compound (A) and the organic peroxide during the grafting/crosslinking reaction. Alternatively the unsaturated compound (A) can be deposited on a filler before being reacted with the polyolefin or the diene elastomer.

The filler is preferably a reinforcing filler such as a silica or silicic acid filler, as used in white tire compositions, or a metal oxide such as a mineral oxide of aluminous type such as alumina trihydrate or an aluminium oxide-hydroxide, or carbon black pre-treated with a alkoxysilane such as tetraethyl orthosilicate, or a silicate such as an aluminosilicate, or a mixture of these different fillers.

The reinforcing filler can for example be any commonly employed siliceous filler used in rubber compounding applications, including pyrogenic or precipitated siliceous pigments or aluminosilicates. Precipitated silicas are preferred, for example those obtained by the acidification of a soluble silicate, e.g., sodium silicate. The precipitated silica preferably has a BET surface area, as measured using nitrogen gas, in the range of about 20 to about 600, and more usually in a range of about 40 or 50 to about 300 square meters per gram. The BET method of measuring surface area is described in the Journal of the American Chemical Society, Volume 60, Page 304 (1930). The silica may also be typically characterized by having a dibutylphthalate (DBP) value in a range of about 100 to about 350, and more usually about 150 to about 300 cm$^3$/100 g, measured as described in ASTM D2414. The silica, and the alumina or aluminosilicate if used, preferably have a CTAB surface area in a range of about 100 to about 220 m$^2$/g (ASTM D3849). The CTAB surface area is the external surface area as evaluated by cetyl trimethylammonium bromide with a pH of 9. The method is described in ASTM D 3849.

Various commercially available silicas may be considered for use in elastomer compositions according to this invention such as silicas commercially available from Rhodia with, for example, designations of Zeosil® 1165 MP, 1115 MP, or HRS1200 MP; 200 MP premium, 80GR or equivalent silicas available from PPG Industries under the Hi-Sil trademark with designations Hi-Sil® EZ150G, 210, 243, etc; silicas available from Degussa AG with, for example, designations VN3, Ultrasil® 7000 and Ultrasil® 7005, and silicas commercially available from Huber having, for example, a designation of Hubersil® 8745 and Hubersil® 8715. Treated precipitated silicas can be used, for example the aluminum-doped silicas described in EP-A-735088.

If alumina is used in the elastomer compositions of the invention, it can for example be natural aluminum oxide or synthetic aluminum oxide ($Al_2O_3$) prepared by controlled precipitation of aluminum hydroxide. The reinforcing alumina preferably has a BET surface area from 30 to 400 m$^2$/g, more preferably between 60 and 250 m$^2$/g, and an average particle size at most equal to 500 nm, more preferably at most equal to 200 nm. Examples of such reinforcing aluminas are the aluminas A125, CR125, D65CR from Baïkowski or the neutral, acidic, or basic $Al_2O_3$ that can be obtained from the Aldrich Chemical Company. Neutral alumina is preferred.

Examples of aluminosilicates which can be used in the elastomer compositions of the invention are Sepiolite, a natural aluminosilicate which might be obtained as PANSIL® from Tolsa S. A., Toledo, Spain, and SILTEG®, a synthetic aluminosilicate from Degussa GmbH.

Examples of mineral fillers or pigments which can be incorporated in the polyolefin or diene elastomer compositions of the invention include titanium dioxide, aluminium trihydroxide, magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, antimony pentoxide, antimony trioxide, beryllium oxide, chromium oxide, iron oxide, lithopone, boric acid or a borate salt such as zinc borate, barium metaborate or aluminium borate, vermiculite, quartz, sand, silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulfide or wollastonite.

Examples of fibrous fillers which can be incorporated in the polyolefin or diene elastomer compositions of the invention include natural fibres such as wood flour, wood fibres, cotton fibres, cellulosic fibres or agricultural fibres such as wheat straw, hemp, flax, kenaf, kapok, jute, ramie, sisal, henequen, corn fibre or coir, or nut shells or rice hulls, or synthetic fibres such as polyester fibres, aramid fibres, nylon fibres, or glass fibres. Examples of organic fillers include lignin, starch or cellulose and cellulose-containing products, or plastic microspheres of polytetrafluoroethylene or polyethylene. The filler can be a solid organic pigment such as those incorporating azo, indigoid, triphenylmethane, anthraquinone, hydroquinone or xanthine dyes.

The concentration of filler or pigment in such filled compositions can vary widely, for example the filler can form from 1 or 2% up to 70% by weight of the total composition.

The reaction between the polyolefin or diene elastomer and the unsaturated compound (A) can be carried out as a batch process or as a continuous process using any suitable apparatus. A batch process can for example be carried out in an internal mixer such as a Banbury mixer or a Brabender Plastograph (Trade Mark) 350S mixer equipped with roller blades. An external mixer such as a roll mill can be used for either batch or continuous processing.

Continuous processing can be effected in an extruder such as a single screw or twin screw extruder. The extruder is preferably adapted to mechanically work, that is to knead or compound, the materials passing through it, for example a twin screw extruder. One example of a suitable extruder is that sold under the trade mark ZSK from Coperion Werner Pfeidener. The extruder preferably includes a vacuum port shortly before the extrusion die to remove any unreacted unsaturated compound (A).

Diene elastomer compositions according to the invention are preferably produced using the conventional two successive preparation phases of mechanical or thermomechanical mixing or kneading ("non-productive" phase) at high temperature, followed by a second phase of mechanical mixing ("productive" phase) at lower temperature, typically less than 110° C., for example between 40° C.-100° C., during which the vulcanization systems are incorporated. The non-productive phase can be carried out as a batch or continuous process as described above. In a batch process, the elastomer and the unsaturated compound (A) are generally mixed together at a temperature above 100° C. for at least 1 minute and can be mixed for up to 20 minutes, although the time of mixing at high temperature is generally 2 to 10 minutes. The residence time of the diene elastomer and the unsaturated compound (A) at above 100° C. in the extruder or other continuous reactor is generally at least 0.5 minutes and preferably at least 1 minute and can be up to 15 minutes. More preferably the residence time is 1 to 5 minutes.

Compositions comprising a crosslinked or branched elastomer produced according to the invention can be cured by various mechanisms to provide further crosslinking if required. The curing agent for the modified elastomer can be a conventional rubber curing agent such as a sulfur vulcanizing agent. Alternatively the modified elastomer can be cured by a radical initiator such as a peroxide.

Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. Sulfur vulcanizing agents are used in an amount ranging from about 0.4 to about 8% by weight based on elastomer, preferably 1.5 to about 3%, particularly 2 to 2.5%.

Accelerators are generally used to control the time and/or temperature required for vulcanization and to improve the properties of the vulcanized elastomer composition. In one embodiment, a single accelerator system may be used, i.e., primary accelerator. Conventionally and preferably, a primary accelerator(s) is used in total amounts ranging from about 0.5 to about 4% by weight based on elastomer, preferably about 0.8 to about 1.5%. In another embodiment, combinations of a primary and a secondary accelerator might be used with the secondary accelerator being used in smaller amounts of about 0.05 to about 3% in order to activate and to improve the properties of the vulcanisate. Delayed action accelerators may be used which are not affected by normal processing temperatures but produce a satisfactory cure at ordinary vulcanization temperatures. Vulcanization retarders can also be used, e.g. phthalic anhydride, benzoic acid or cyclohexylthiophthalimide. Suitable types of accelerators that may be used in the present invention are amines, disulfides, guanidines, thioureas, thiazoles, for example mercaptobenzothiazole, thiurams, sulfenamides, dithiocarbamates, thiocarbonates, and xanthates. Preferably, the primary accelerator is a sulfenamide. If a second accelerator is used, the secondary accelerator is preferably a guanidine, dithiocarbamate or thiuram compound.

If the curing system is composed of sulphur, the vulcanization, or curing, of a rubber product such as a tire or tire tread is carried out in known manner at temperatures preferably between 130°-200° C., under pressure, for a sufficiently long period of time. The required time for vulcanization may vary for example between 2 and 30 minutes.

Filled compositions according to the invention can contain a coupling agent, for example a trialkoxy, dialkoxy or monoalkoxy silane coupling agent, particularly a sulfidosilane or mercaptosilane or an azosilane, acrylamidosilane, blocked mercaptosilane, aminosilane alkylsilane or alkenylsilane having 1 to 20 carbon atoms in the alkyl group and 1 to 6 carbon atoms in the alkoxy group. Examples of preferred coupling agents include a bis(trialkoxysilylpropyl)disulfane or tetrasulfane as described in U.S. Pat. No. 5,684,171, such as bis(triethoxysilylpropyl)tetrasulfane or bis(triethoxysilylpropyl)disulfane, or a bis(dialkoxymethylsilylpropyl)disulfane or tetrasulfane such as bis(methyldiethoxysilylpropyl) tetrasulfane or bis(methyldiethoxysilylpropyl)disulfane, or a bis(dimethylethoxysilylpropyl)oligosulfane such as bis(dimethylethoxysilylpropyl)tetrasulfane or bis(dimethylethoxysilylpropyl)disulfane, or a bis(dimethylhydroxysilylpropyl) polysulfane as described in U.S. Pat. No. 6,774,255, or a dimethylhydroxysilylpropyl dimethylalkoxysilylpropyl oligosulfane as described in WO-A-2007/061550, or a mercaptosilane such as triethoxysilylpropylmercaptosilane. Such a coupling agent promotes bonding of the filler to the elastomer or polyolefin, thus enhancing the physical properties of the filled elastomer or polyolefin. The filler can be pre-treated with the coupling agent or the coupling agent can be added to the mixer with the elastomer or polyolefin and filler and the unsaturated compound (A) according to the invention.

For many uses the polymer compositions of the invention preferably contain at least one antioxidant. Examples of suitable antioxidants include tris(2,4-di-tert-butylphenyl)phosphite sold commercially under the trade mark Ciba Irgafos® 168, tetrakis[methylene-3-(3,5-di-tert-butyl-4-hydroxyphenyl-propionate)]methane processing stabilizer sold commercially under the trade mark Ciba Irganox® 1010 and 1,3,5-trimethyl-2,4,6-tris(3,5-di-tert-butyl-4-hydroxy benzyl) benzene sold commercially under the trade mark Ciba Irganox® 1330, N-1,3-dimethylbutyl-N-phenyl-para-phenylenediamine, sold as "Santoflex 6-PPD" (trade mark) from Flexsys, diphenyl-p-phenylenediamine and others, for example those disclosed in The Vanderbilt Rubber Handbook (1978), Pages 344 through 346. It may also be desired that the polymer composition contains a stabiliser against ultraviolet radiation and light radiation, for example a hindered amine light stabiliser such as a 4-substituted-1,2,2,6,6-pentamethylpiperidine, for example those sold under the trademarks Tinuvin® 770, Tinuvin® 622, Uvasil® 299, Chimassorb® 944 and Chimassorb® 119. The antioxidant and/or hindered amine light stabiliser can conveniently be incorporated in the polyolefin or diene elastomer with the unsaturated compound (A), and the organic peroxide if used, during the crosslinking and/or branching reaction. The total concentration of antioxidants and light stabilisers in the crosslinked polyolefin is typically in the range 0.02 to 0.15% by weight of the total composition. The total concentration of antioxidants and light stabilisers in the crosslinked diene elastomer is typically in the range 0.1 to 5% by weight.

Elastomer compositions according to the invention can be compounded with various commonly-used additive materials such as processing additives, for example oils, resins including tackifying resins, plasticizers, fatty acid, zinc oxide, waxes, antiozonants, heat stabilizers, UV stabilizers, dyes, pigments, extenders and peptizing agents. Typical amounts of tackifier resins, if used, comprise about 0.5 to about 10% by weight based on elastomer, preferably 1 to 5%. Typical amounts of processing aids comprise about 1 to about 50% by weight based on elastomer. Such processing aids can include, for example, aromatic, naphthenic, and/or paraffinic processing oils. Typical amounts of fatty acids, if used, which can include stearic acid or zinc stearate, comprise about 0.1 to about 3% by weight based on elastomer. Typical amounts of zinc oxide comprise about 0 to about 5% by weight based on elastomer alternatively 0.1 to 5%. Typical amounts of waxes comprise about 1 to about 5% by weight based on elastomer. Microcrystalline and/or crystalline waxes can be used. Typical amounts of peptizers comprise about 0.1 to about 1% by weight based on elastomer. Typical peptizers may for example be pentachlorothiophenol or dibenzamidodiphenyl disulfide.

Polyolefin compositions according to the invention can also contain other additives such as dyes or processing aids.

The crosslinked and/or branched polyolefin composition produced according to the invention can be used in a wide variety of products. The crosslinked and/or branched polyolefin composition can be blow moulded or rotomoulded to form bottles, cans or other liquid containers, liquid feeding parts, air ducting parts, tanks, including fuel tanks, corrugated bellows, covers, cases, tubes, pipes, pipe connectors or transport trunks. The crosslinked and/or branched polyolefin composition can be blow extruded to form pipes, corrugated pipes, sheets, fibres, plates, coatings, film, including shrink wrap film, profiles, flooring, tubes, conduits or sleeves or extruded onto wire or cable as an electrical insulation layer. The crosslinked and/or branched polyolefin composition can be injection moulded to form tube and pipe connectors, packaging, gaskets and panels. The crosslinked and/or branched polyolefin composition can also be foamed or thermoformed.

The crosslinked and/or branched diene elastomer composition containing a curing agent such as a vulcanizing system is shaped and cured into an article. The elastomer composition can be used to produce tyres, including any part thereof such as the bead, apex, sidewall, inner liner, tread or carcass. The elastomer composition can alternatively be used to produce any other engineered rubber goods, for example bridge suspension elements, hoses, belts, shoe soles, anti seismic vibrators, and dampening elements. The elastomer composition can be cured in contact with reinforcing elements such as cords, for example organic polymer cords such as polyester, nylon, rayon, or cellulose cords, or steel cords, or fabric layers or metallic or organic sheets.

Articles formed from the crosslinked and/or branched polyolefins have enhanced physical/mechanical properties and/or enhanced heat resistance, scratch resistance and flame retardancy compared to articles formed from the same polyolefin without crosslinking or branching. Vulcanised articles formed from the crosslinked and/or branched diene elastomers have enhanced physical/mechanical properties and enhanced heat resistance, scratch resistance and flame retardancy compared to articles formed from the same diene elastomer without crosslinking or branching.

The invention provides a polymer composition comprising a polyolefin or a diene elastomer, and an unsaturated compound (A) containing at least two groups each comprising an olefinic —C=C— bond or acetylenic —C≡C— bond, characterized in that each group comprising an olefinic —C=C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation.

Preferably, the polyolefin comprises at least 50% by weight units of an alpha-olefin having 3 to 8 carbon atoms.

Preferably, the polyolefin is polypropylene.

Preferably, each group comprising an olefinic —C=C— bond or acetylenic —C≡C— bond in the unsaturated compound (A) contains an electron-withdrawing moiety with respect to the olefinic —C=C— or acetylenic —C≡C— bond.

Preferably, each group comprising an olefinic —C=C— bond or acetylenic —C≡C— bond in the unsaturated compound (A) has the formula R—CH=CH—CH=CH—Y—, where R represents hydrogen or a hydrocarbyl group having 1 to 12 carbon atoms and Y represents an organic linkage having an electron withdrawing effect with respect to the adjacent —CH=CH— bond.

Preferably, the unsaturated compound (A) is a sorbate ester of a polyhydric alcohol.

Preferably, the sorbate ester is pentaerythritol trisorbate, pentaerythritol tetrasorbate, trimethylolpropane trisorbate, propane-1,2-diol disorbate or propane-1,3-diol disorbate.

The invention provides a process for forming a crosslinked or branched polyolefin comprising reacting the polyolefin with an unsaturated compound (A) containing more than two groups each comprising an olefinic —C=C— bond or acetylenic —C≡C— bond in the presence of means capable of generating free radical sites in the polyolefin, characterized in that each group comprising an olefinic —C=C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation.

Preferably, an organic peroxide compound capable of generating free radical sites in the polyolefin is present in the composition in an amount of 0.01 to 5% by weight based on the total composition.

Preferably, the process for forming a crosslinked or branched diene elastomer comprises reacting the diene elastomer with an unsaturated compound (A) containing more than two groups each comprising an olefinic —C=C— bond or acetylenic —C≡C— bond, characterized in that each group comprising an olefinic —C=C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation.

Preferably, 85 to 100 parts by weight polyolefin or diene elastomer are reacted with 0.01 to 10 parts by weight of the unsaturated compound (A).

Preferably, the unsaturated compound (A) is deposited on a filler before being reacted with the polyolefin or diene elastomer.

Preferably, the unsaturated compound (A), a filler and the polyolefin or diene elastomer are reacted in situ.

The invention provides the use of an unsaturated compound (A) containing more than two groups each comprising an olefinic —C=C— bond or acetylenic —C≡C— bond, in which each group comprising an olefinic —C=C— bond or acetylenic —C≡C— bond contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation, in crosslinking a polyolefin with less degradation of the polyolefin compared to crosslinking with a polyunsaturated compound not containing conjugated unsaturation.

The invention is illustrated by the following Examples.

Raw Materials

The polymers used were:
PP=Isotactic polypropylene homopolymer supplied as Borealis® HB 205 TF (melt flow index MFR 1 g/10 min at 230° C./2.16 kg measured according to ISO 1133);
Porous PP was microporous polypropylene supplied by Membrana as Accurel® XP100. This microporous polymers was used for absorbing liquid ingredients. Characteristics of Accurel® XP100 are MFR (2.16 kg/230° C.) 2.1 g/10 min (method ISO01133), and melting temperature (DSC) 156° C.

The peroxide used is:
DHBP was 2,5-dimethyl-2,5-di-(tert-butylperoxy)hexaneperoxide supplied as Arkema Luperox® 101 peroxide.

Anti-oxidants used were:
Irgafos 168 was tris-(2,4-di-tert-butylphenyl)phosphite antioxidant supplied by Ciba as Irgafos® 168
Irganox® 1010 was tetrakis [methylene-3-(3,5-di-tert-butyl-4-hydroxyphenyl-propionate)]methane phenolic antioxidant supplied by Ciba as Irganox® 1010.

The co-agents were:
Styrene (99% pure supplied by Sigma-Aldrich Reagent Plus® (ref. S4972))
Ethyl sorbate 98% supplied by Sigma-Aldrich Reagent Plus® (ref. 177687)
Pentaerythritol tetraacrylate (PETA) was supplied by Sigma-Aldrich Reagent Plus® (ref. 408263) and Trimethylolpropane triacrylate (TMPTA) supplied by Cray Valley (ref. SARTOMER 351);
Pentaerythritol tetrasorbate (PETS), Trimethylolpropane trisorbate (TMPTS) and Propane-1,3-diol disorbate ("Di-sorbate") were prepared by acid catalyzed esterification of the corresponding polyhydric alcohol according to Example 4 of U.S. Pat. No. 3,458,460.

EXAMPLE 1

10 parts by weight porous PP pellets were tumbled with 1.87 parts by weight PETS and 0.2 parts DHBP until the liquid reagents were absorbed by the polypropylene to form a multi-functional sorbate masterbatch.

100 parts by weight Borealis® HB 205 TF polypropylene pellets were loaded in a Brabender® Plastograph 350E mixer equipped with roller blades, in which compounding was carried out. Filling ratio was set to 0.7. Rotation speed was 50 rpm, and the temperature of the chamber was maintained at 190° C. Torque and temperature of the melt were monitored for controlling the reactive processing of the ingredients. The PP was loaded in three portions allowing 1 minute fusion/mixing after each addition. The multi-functional sorbate masterbatch was then added and mixed for 4 minutes to start the grafting reaction. 0.5 parts Irganox 1010 and 0.5 parts Irgafos 168 antioxidants were then added and mixed for a further 1 minute during which grafting continued. The melt was then dropped from the mixer and cooled down to ambient temperature. The resulting grafted polypropylene was moulded into 2 mm thick sheet on an Agila® PE30 press at 210° C. for 5 minutes before cooling down to ambient temperature at 15° C./min with further pressing.

EXAMPLES 2 AND 3

Example 1 was repeated replacing PETS by corresponding amount of either TMPTS or Di-sorbate necessary to match the molar amount of sorbyloxy-functions as shown in Table 1.

COMPARATIVE EXAMPLES C1 AND C2

In Comparative example C1, Example 1 was repeated with the omission of PETS. In Comparative Example C2, PETS and the peroxide were omitted.

COMPARATIVE EXAMPLES C3 AND C4

Examples 1 and 2 were repeated replacing PETS and TMPTS by corresponding amount of respectively PETA and TMPTA necessary to match the molar amount of acrylate-functions to those of sorbyloxy-functions as shown in Table 1.

COMPARATIVE EXAMPLES C5

Comparative examples C4 was repeated with the addition of 1.6 parts styrene as co-agents as shown in Table 1.

For each Example, the torque during compounding and the elastic shear modulus G' of the crosslinked polypropylene were measured. These are recorded in Table 1.

The processing torque is the measure of the torque in Newton*meter (N·m) applied by the motor of the Plastograph 350E mixer to maintain the mixing speed of 50 rpm. The value reported is the one of the torque level plateau at the end of the mixing.

The lower the torque, the lower the polymer viscosity. The torque level at the end of mixing stage is therefore an image of polymer degradation during mixing.

Elastic shear modulus (G') measurements were carried out on the Advanced Polymer Analyzer APA2000®. 3.5 g specimens were analyzed above their melting point, at temperature of 210° C. Elastic shear modulus (G') was recorded upon strain sweep under constant oscillating conditions (0.5 Hz). Recording the elastic shear modulus (G'), viscous modulus (G"), and TanD on a range of strain from 1 to 610% takes approximately 8 minutes. From the various plots of G' as a function of percentage strain, the values at 12% strain were all in the linear viscoelastic region. The G'@12% strain value was therefore selected in order to follow the change in elastic shear modulus as a function of degradation and crosslinking of the specimens described in the Examples.

The gel content of the polypropylene sheet was measured and recorded in Table 1. Gel content was determined using method ISO 10147 "Pipes and fittings made of crosslinked polyethylene (PE-X)—Estimation of the degree of crosslinking by determination of the gel content". The principle of the test consists in measuring the mass of a test piece taken from a moulded part before and after immersion of the test piece in a solvent (8 hours in refluxing xylene). The degree of crosslinking is expressed as the mass percentage of the insoluble material.

Comparing Examples 1 to 3 with Comparative Examples C1 and C2, we observed the significant effect of the formulation of our invention for preventing the degradation of the polypropylene in comparison to formulation made with peroxide and absence of any additive (Comparative example C1). Examples 1 to 3 showed higher torque values than Comparative Examples C1, approaching or even exceeding the torque value of PP without peroxide (Comparative Example C2). Examples 1 to 3 also showed substantial crosslinking as illustrated by the high G' and gel content values obtained which results from the good grafting efficiency of the unsaturated compound to the polypropylene resin while preventing its degradation. This showed the efficiency of the formulation of our invention for crosslinking polypropylene.

Comparing Examples 1 to 3 with Comparative Examples C3 and C4, we observed the significant effect of the formulation of our invention for preventing the degradation of the polypropylene and for crosslinking polypropylene in comparison to formulation made with acrylate compounds. Examples 1 to 3 showed higher torque and G' and Gel Content values than Comparative Examples C3 and C4 which suffered polypropylene degradation during grafting.

The use of a co-agent such as styrene in combination with the multifunctional acrylate is known to inhibit polymer degradation. A comparison of Examples 1 to 3 with Comparative Example C5 showed that the formulation of our invention allows reaching similar performance than formulation using simultaneously an acrylate compound and styrene as a co-agent but without the need of such a co-agent.

TABLE 1

|  | Example 1 | Example 2 | Example 3 | Comparative example C1 | Comparative example C2 | Comparative example C3 | Comparative example C4 | Comparative example C5 |
|---|---|---|---|---|---|---|---|---|
| PP | 100 | 100 | 100 | 100 | 100 | 100 | 100 | 100 |
| Porous PP | 10 | 10 | 10 | 10 | 10 | 10 | 10 | 10 |
| DHBP | 0.2 | 0.2 | 0.2 | 0.2 | — | 0.2 | 0.2 | 0.2 |
| Irganox ® 1010 | 0.5 | 0.5 | 0.5 | 0.5 | 0.5 | 0.5 | 0.5 | 0.5 |
| Irgafos ® 168 | 0.5 | 0.5 | 0.5 | 0.5 | 0.5 | 0.5 | 0.5 | 0.5 |
| Di-sorbate | — | — | 3.9 | — | — | — | — | — |
| PETS | 1.9 | — | — | — | — | — | — | — |
| TMPTS | — | 2.0 | — | — | — | — | — | — |
| PETA | — | — | — | — | — | 1.1 | — | — |
| TMPTA | — | — | — | — | — | — | 1.4 | 1.4 |
| Styrene | — | — | — | — | — | — | — | 1.6 |
| Ethyl sorbate | — | — | — | — | — | — | — | — |
| Torque (Nm) | 75 | 97 | 71 | 15 | 77 | 40 | 41 | 97 |
| G'@12% strain (kPa) | 2 | 12 | 14 | — | 13 | 0 | 0 | 10 |
| Gel Content (%) | 24 | 35 | 36 | 0 | 0 | 6 | 1 | 34 |

The invention claimed is:

1. A polymer composition comprising a polyolefin or a diene elastomer, and an unsaturated compound (A) containing at least two groups each comprising an olefinic —C═C— bond or acetylenic —C≡C— bond, wherein each group comprising an olefinic —C═C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C═C— or acetylenic —C≡C— unsaturation, wherein each group comprising an olefinic —C═C— bond or acetylenic —C≡C— bond in the unsaturated compound (A) contains an electron-withdrawing moiety with respect to the olefinic —C═C— or acetylenic —C≡C— bond.

2. A polymer composition according to claim 1 wherein the polyolefin comprises at least 50% by weight units of an alpha-olefin having 3 to 8 carbon atoms.

3. A polymer composition according to claim 2 wherein the polyolefin is polypropylene.

4. A polymer composition according to claim 1 wherein each group comprising an olefinic —C═C— bond or acetylenic —C≡C— bond in the unsaturated compound (A) has the formula R—CH═CH—CH═CH—Y—, where R represents hydrogen or a hydrocarbyl group having 1 to 12 carbon atoms and Y represents an organic linkage having an electron withdrawing effect with respect to the adjacent —CH═CH— bond.

5. A polymer composition according to claim 4 wherein the unsaturated compound (A) is a sorbate ester of a polyhydric alcohol.

6. A polymer composition according to claim 5 wherein the sorbate ester is pentaerythritol trisorbate, pentaerythritol tetrasorbate, trimethylolpropane trisorbate, propane-1,2-diol disorbate or propane-1,3-diol disorbate.

7. A process for forming a crosslinked or branched polyolefin comprising reacting the polyolefin with an unsaturated compound (A) containing more than two groups each comprising an olefinic —C═C— bond or acetylenic —C≡C— bond in the presence of means capable of generating free radical sites in the polyolefin, wherein each group comprising an olefinic —C═C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C═C— or acetylenic unsaturation.

8. A process according to claim 7 wherein the means capable of generating free radical sites in the polyolefin is an organic peroxide compound present in an amount of 0.01 to 5% by weight during the step of reacting the polyolefin with the unsaturated compound (A).

9. A process according to claim 7 wherein 85 to 100 parts by weight polyolefin are reacted with 0.01 to 10 parts by weight of the unsaturated compound (A).

10. A process according to claim 7 wherein the unsaturated compound (A) is deposited on a filler before being reacted with the polyolefin.

11. A process according to claim 7 wherein the unsaturated compound (A), a filler and the polyolefin are reacted in situ.

12. A process for forming a crosslinked or branched diene elastomer comprising reacting the diene elastomer with an unsaturated compound (A) containing more than two groups each comprising an olefinic —C═C— bond or acetylenic —C≡C— bond, wherein each group comprising an olefinic —C═C— bond or acetylenic —C≡C— bond in the unsaturated compound (A) contains an aromatic ring or a further olefinic double bond or acetylenic unsaturation, the aromatic ring or the further olefinic double bond or acetylenic unsaturation being conjugated with the olefinic —C═C— or acetylenic —C≡C— unsaturation.

13. A process according to claim 12 wherein 85 to 100 parts by weight diene elastomer are reacted with 0.01 to 10 parts by weight of the unsaturated compound (A).

14. A process according to claim 12 wherein the unsaturated compound (A) is deposited on a filler before being reacted with the diene elastomer.

15. A process according to claim 12 wherein the unsaturated compound (A), a filler and the diene elastomer are reacted in situ.

* * * * *